United States Patent [19]

Law et al.

[11] Patent Number: 5,749,954
[45] Date of Patent: May 12, 1998

[54] PERLITE-BASED INSULATION BOARD

[75] Inventors: David Chee-Fai Law; Christopher Paul Sandoval; Ruben G. Garcia, all of Littleton, Colo.

[73] Assignee: Johns Manville International, Inc., Denver, Colo.

[21] Appl. No.: 680,091

[22] Filed: Jul. 15, 1996

[51] Int. Cl.$^6$ .................. D21H 17/28; D21H 17/66; D21J 1/00

[52] U.S. Cl. .................. 106/282; 106/162.51; 106/164.5; 106/164.53; 106/164.6; 106/204.01; 106/216.1; 106/217.01; 106/DIG. 2; 162/171; 162/145; 162/175; 162/181.1; 162/142; 162/147; 252/62

[58] Field of Search .................. 106/163.1, 210, 106/214, 202, 204, 281.1, 282, DIG. 2, DIG. 7, 675, 162.51, 164.5, 164.53, 164.6, 204.01, 216.1, 217.01; 162/141, 145, 147, 171, 175, 181.1, 142; 252/62; 524/13, 35, 47

[56] References Cited

U.S. PATENT DOCUMENTS

| | | |
|---|---|---|
| 2,538,236 | 1/1951 | Denning . |
| 3,042,578 | 7/1962 | Denning . |
| 3,892,586 | 7/1975 | Vladar .................. 162/171 |
| 3,988,199 | 10/1976 | Hillmer .................. 162/171 |
| 4,101,335 | 7/1978 | Barrable .................. 106/DIG. 3 |
| 4,126,512 | 11/1978 | Hill .................. 162/171 |
| 4,229,222 | 10/1980 | Schneider .................. 106/900 |
| 4,313,997 | 2/1982 | Ruff et al. .................. 106/DIG. 2 |
| 4,600,560 | 7/1986 | Vallak .................. 106/DIG. 2 |
| 4,840,672 | 6/1989 | Baes .................. 524/2 |
| 5,155,959 | 10/1992 | Richards .................. 106/772 |
| 5,171,366 | 12/1992 | Richards .................. 106/772 |
| 5,264,257 | 11/1993 | Martinez . |
| 5,305,577 | 4/1994 | Richards .................. 52/799 |
| 5,322,738 | 6/1994 | Breidenbach .................. 428/532 |
| 5,539,028 | 7/1996 | Bednar et al. .................. 162/145 |
| 5,558,710 | 9/1996 | Baig .................. 106/DIG. 2 |

*Primary Examiner*—Michael Marcheschi
*Attorney, Agent, or Firm*—Robert D. Touslee

[57] ABSTRACT

A perlite-based insulation board includes, by dry weight, between about 50% and about 76% expanded perlite; between about 15% and about 45% fibers; between about 1% and about 5% starch; between about 2% and about 9% bituminous material; and about 0% to about 3% alum. The fibers are between about 50% and about 95% by dry weight recycled newsprint fibers and between about 5% and about 50% by dry weight virgin cellulose fibers, such as flax and/or peanut hull fibers. In one embodiment, the virgin cellulose fibers are, by dry weight, between about 10% and 40% flax fibers and about 60% and 90% peanut hull fibers.

15 Claims, No Drawings

PERLITE-BASED INSULATION BOARD

BACKGROUND OF THE INVENTION

The present invention relates to an improved perlite-based insulation board especially designed for use in roof insulation systems, such as, but not limited to, built-up, modified bitumen and single ply roofing systems.

Perlite-based insulation boards, such as perlite-based insulation boards marketed by Schuller International, Inc. under the trademark "FESCO", have been commercially available for decades. These perlite-based insulation boards are highly satisfactory insulating products that are well adapted for use as roof insulation boards. These perlite-based insulation boards provide good thermal performance; are relatively low in density (generally ranging from about 9 to about 15 pounds per cubic foot); and exhibit good break load and flexural strength as well as good compressive resistance. These perlite-based insulation boards are also resistant to fire and water absorption and possess other desirable physical properties. U.S. Pat. No. 4,126,512, issued on Nov. 21, 1978, and entitled Perlitic Insulating Board, is representative of these types of perlite-based insulation boards and the disclosure of this patent is hereby incorporated by reference.

Other than expanded perlite, which constitutes between about 50% and about 76% by dry weight of these insulation boards, these perlite-based insulation boards comprise between about 15% and about 45% by dry weight cellulose fiber; between about 1% and about 5% by dry weight binder; and between about 2% and about 9% by dry weight bituminous material to increase the insulation board's resistance to water absorption.

Since cellulose fiber comprises between about 15% and about 45% by dry weight of the perlite-based insulation boards and, typically, between about 25% and about 35% by dry weight of the perlite-based insulation boards, the raw material cost of the cellulose fiber used in the insulation boards is an important factor in the cost of manufacturing the perlite-based insulation boards. In addition, since the perlite-based insulation boards are formed from an aqueous slurry, containing the board ingredients, in a continuous wet-laid process on free-draining equipment, such as a Fourdrinier machine, and subsequently, dried in an oven, any reduction in the water retention of the boards delivered to the oven for drying can have a very beneficial effect on manufacturing costs of the perlite-based insulation boards due to a decrease in gas consumption.

The cellulose fiber presently used in perlite-based insulation boards, such as FESCO board roof insulation, is fiber from recycled newspaper print, telephone books and the like. Due to the pulping process involved in making newsprint and similar paper products, which includes chemical as well as mechanical pulping of the cellulose fiber, lignin is removed from the cellulose fiber in the newsprint and this cellulose fiber, with reduced levels of lignin, is bonded together, at least in part, by means of a hydrogen bonding between the fibers. The hydrogen bonding of the cellulose fiber from the recycled newsprint in perlite-based insulation board is very beneficial and contributes to the strength and integrity of the perlite-based insulation board. Thus, the use of recycled newsprint and similar products in the formation of perlite-based insulation boards is very desirable. However, in recent years the price of recycled newsprint has fluctuated greatly, ranging from about $20.00 to about $180.00 per ton. Such fluctuations in the cost of a major component of perlite-based insulation boards can have an adverse effect on the cost of manufacturing perlite-based insulation boards. Thus, there has been a need to find other less costly fiber which can be substituted, at least in part, for cellulose fiber from recycled newsprint without adversely affecting the physical properties required of such an insulation product or otherwise increasing the manufacturing costs of the perlite-based insulation boards.

SUMMARY OF THE INVENTION

The present invention relates to a perlite-based insulation board of the general type discussed above, which is especially adapted for use as roof insulation. However, in the perlite-based insulation board of the present invention from about 5% to about 50% by dry weight of the cellulose fiber in the insulation board is virgin cellulose fiber rather than newsprint fiber. The term "virgin cellulose fibers" in this specification means cellulose fibers which have not been recycled from a consumer product; and although these cellulose fibers may have been subjected to hammer milling or other mechanical processing prior to introduction into a slurry of ingredients from which the perlite-based insulation board is formed, these cellulose fibers have not been subjected to chemical pulping to remove lignin from the cellulose fibers.

More specifically, the perlite-based insulation board of the present invention comprises, by dry weight, between about 50% and about 76% expanded perlite; between about 15% and about 45% fibers; between about 1% and about 5% starch; between about 2% and about 9% bituminous material; and about 0% to about 3% alum. The fibers are between about 50% and about 95% by dry weight recycled newsprint fibers and between about 5% and about 50% by dry weight virgin cellulose fibers, such as flax and/or peanut hull fibers. While non-cellulose fibers could be used as a portion of the fibers in the perlite-based insulation board of the present invention, it is preferred to use only cellulose fibers which are chemically related to wood pulp, available in vast quantities at relatively low cost, and environmentally safe, thereby avoiding certain problems associated with non-cellulose fibers, such as chemical incompatibility with wood pulp, relatively high costs, lack of availability in large quantities, processing difficulties and other problems.

Since the virgin cellulose fibers differ from the newsprint fibers, with respect to the lignin levels in the fibers, it was feared that the use of such fibers, especially in amounts greater than 3% by dry weight of the cellulose fibers in the perlite-based insulation boards, would adversely affect the physical properties of the insulation boards such that the boards would not meet the required performance specifications for these types of insulation boards, especially for roofing applications. There was concern that the use of the virgin cellulose fibers would: weaken the insulation boards due to a lack of hydrogen bonding; cause the insulation boards to retain too much water, exiting the Fourdrinier machine, thereby raising production costs due an increased need for drying; absorb too much water when exposed to rain in service; promote algae growth in high-humidity environments; or fail fire resistance tests. In tests, it was found that the virgin cellulose fibers in perlite-based insulation boards, containing virgin cellulose fibers (peanut hull fibers or flax fibers) in amounts up to about 40% by dry weight of the fibers in the perlite-based insulation board (13% by dry weight of the perlite-based insulation board), exhibited sufficient hydrogen bonding that the insulation boards still met the strength requirements as well as the other performance requirements for perlite-based insulation boards used in roofing applications. In fact, the use of the virgin cellulose fibers, especially flax fibers, caused the insulation boards to retain less water during the production process, thereby reducing drying costs. Thus, without having to change the existing manufacturing process, applicants were able to make perlite-based insulation boards containing virgin cellulose fibers, in amounts up to 40% by dry weight of the fibers in the insulation board, which met all of the performance requirements for such insulation boards. However, when using the same process, as the amount, by dry weight, of peanut hull fibers in the insulation boards approached about 50% of the fibers in the perlite-based insulation boards (16.5% by dry weight of the perlite-based insulation boards), the physical strength (measured as Break Load) of the perlite-based insulation boards decreased to a point where the insulation boards no longer met the performance specifications required for such insulation boards when used for roofing applications.

DESCRIPTION OF THE PREFERRED EMBODIMENTS

The perlite-based insulation boards of the present invention preferably have densities between about nine and about fifteen pounds per cubic foot; are typically two by four feet or four by four feet in width and length; and range from about ½ of an inch to about 1½ inches in thickness. If desired, insulation boards of greater thicknesses can be formed by adhesively bonding and laminating two or more of the perlite-based insulation boards together.

The perlite-based insulation board of the present invention comprises, by dry weight, between about 50% and about 76% expanded perlite; between about 15% and about 45% fibers; between about 1% and about 5% starch; between about 2% and about 9% bituminous material; and about 0% to about 3% alum. The fibers comprise between about 50% and about 95% by dry weight recycled newsprint fibers and between about 5% and about 50% by dry weight virgin cellulose fibers, such as flax and/or peanut hull fibers.

The perlite particles used in the insulation boards of the present invention are expanded perlite particles preferably having a density of about 3 to about 6 pounds per cubic foot. Since the expanded perlite particles are inorganic, the expanded perlite particles contribute to the fire resistance of the insulation board. In addition, the perlite particles have excellent thermal insulating properties and greatly enhance the overall thermal insulating properties of the insulating boards.

The cellulose fibers are used in the perlite-based insulation boards primarily for the strength the cellulose fibers add to the insulating board through the hydrogen bonding between the cellulose fibers and an interfelting of the newsprint and virgin cellulose fibers with the expanded perlite particles which assists in holding the expanded perlite particles in place within the insulation boards. The cellulose fibers also act as a bulking material to maintain the perlite-based insulation boards within the desired density range for such products.

The bituminous material in the perlite-based insulation boards provides the insulation boards with a greater resistance to water absorption and also assists the cellulose fibers in holding the expanded perlite particles in place within the insulation boards. In a preferred embodiment of the present invention, the expanded perlite particles are pre-coated with the bituminous material before being introduced into the slurry of the wet forming operation. While other bituminous materials could be used in the perlite-based insulation board of the present invention, asphalt is the preferred bituminous material. Asphalt is economical, readily available and performs well in the perlite-based insulation board of the present invention.

The starch in the perlite-based insulation board of the present invention can be any of numerous commercially available starches which function as a binder to assist in holding the interfelted fibers and expanded perlite particles together in the insulation board. Alum is used, when needed, to adjust the pH level of the slurry of ingredients being formed into the perlite-based insulation board to a desired level so that the perlite-based insulation board is formed correctly.

In the production of the perlite-based insulation board of the present invention, the perlite particles are expanded and, preferably coated with a hot melt asphalt; the newsprint and virgin cellulose fibers are hydrapulped in a conventional hydrapulper; and the starch is mixed with water. An asphalt emulsion can be introduced into the hydrapulper in place of pre-coating the expanded perlite particles or in addition to pre-coating the expanded perlite particles. Alum can also be introduced into the hydrapulper, if needed, to adjust the pH levels of the slurry. These ingredients are then transferred from their respective storage facilities and metered into an infuser where the ingredients are blended and delivered as a slurry to a wet forming apparatus such as a Fourdrinier machine. The wet forming apparatus transforms the slurry of ingredients into a wet-laid mat of a selected thickness, density and percent solids. The wet-laid mat is then passed through a drier where it is dried into a perlite-based insulation board. The perlite-based insulation board is conveyed to a finishing area where the insulation board is cut and trimmed into insulation boards of the desired widths and lengths.

In the hydrapulping operation, the newsprint is repulped and the virgin cellulose fibers are pulped. Prior to the hydrapulping operation, the virgin cellulose fibers are hammer milled or otherwise reduced in length, if needed, to lengths of preferably less than one inch and most preferably to lengths such that the hammer milled fibers pass through screens during the hammer milling operation having openings between ¼ and ½ of an inch. When fibers greater than one inch in length were used in the process, such fibers tended to twist into ropes or otherwise become trapped within the hydrapulper.

FESCO board roof insulation which is especially adapted for use in built-up, modified bitumen and single ply roofing systems exhibits the following physical properties when made exclusively with recycled newsprint fibers or when made with a cellulose fiber mix, by dry weight, of up to about 40% virgin cellulose fibers and 60% recycled newsprint fibers:

| PROPERTY | 1 INCH BOARD | ¾ INCH BOARD |
| --- | --- | --- |
| THICKNESS INCHES | 0.95–0.99 | 0.74–0.76 |
| DENSITY PCF | 9.0–11.0 | 9.0–11.0 |
| WATER ABSORPTION % BY VOLUME | 1.5 | 1.5 |
| BREAKING LOADS POUNDS | 11.0 MIN. | 5.1 MIN. |
| PERLITE % BY WEIGHT | 60.0–72 | 60.0–72 |
| CELLULOSE FIBER % BY WEIGHT | 23.0–35.0 | 23.0–35.0 |

While there was a slight reduction in the breaking load strength of the perlite-based insulation boards made with peanut hull virgin cellulose fibers in amounts up to about 40% by dry weight of the cellulose fiber blend in the insulation board, the perlite-based insulation board made with the peanut hull fibers maintained the breaking load strength and the water absorption properties required of the product. Thus, the perlite-based insulation boards of the present invention were able to maintain the physical properties required for such insulation boards. In addition, it was found that the perlite-based insulation boards made with the blend of peanut hull virgin cellulose fibers and recycled newsprint fibers drained better than the perlite-based insulation boards made exclusively with recycled newsprint fibers. Thus, the new perlite-based insulation boards can provide not only a material cost savings when compared with the prior perlite-based insulation boards made exclusively with newsprint fibers, but also present a process cost reduction by reducing the energy required to dry the insulation boards.

Perlite-based insulation boards of the present invention made with a blend of flax virgin cellulose fibers and recycled newsprint fibers with the flax fibers present in the blend in amounts up to about 20% by weight of the fibers in the perlite-based insulation board, exhibited greater breaking load strength than perlite-based insulation board made exclusively with recycled newsprint fibers. The water absorption properties of this perlite-based insulation board met the required density and water absorption characteristics for the product set forth in the above table. In addition, it was found that the perlite-based insulation boards made with the blend of flax virgin cellulose fibers and recycled newsprint fibers drained better than the perlite-based insulation boards made exclusively with newsprint fibers. Thus, these new perlite-based insulation boards can provide not only a material cost savings when compared with the prior perlite-based insulation boards made exclusively with newsprint fibers, but also present a process cost reduction by reducing the energy required to dry the insulation boards.

While recycled newsprint fibers and peanut hull virgin cellulose fibers are short fibers, flax virgin cellulose fibers used in the perlite-based insulation boards of the present invention are relatively long fibers e.g. up to about ½ inch. While the recycled newsprint fibers are hydrophilic, both flax virgin cellulose fibers and peanut hull virgin cellulose fibers are relatively hydrophobic because these virgin cellulose fibers contain more lignin. Samples of the perlite-based insulation board of the present invention comprising, by dry weight, about 58% asphalt coated expanded perlite, about 33% fiber, about 3% starch, about 3% asphalt emulsion and about 3% alum were made with a blend of about 40% virgin cellulose fibers by dry weight and 60% recycled newsprint fibers by weight with the virgin cellulose fibers being between about 10% and about 40% by dry weight flax fibers and between about 60% and about 90% by dry weight peanut hull fibers and, preferably, about 25% flax fibers and about 75% peanut hull fibers. During the preparation of these insulation boards, it was observed that the water drained out of the slurry by gravity at a very fast rate and that no noticeable amount of water could later be pressed out of the wet boards by a hydraulic press. Thus, since gas consumption, required to dry wet-laid board such as the insulation board of the present invention, is a major production cost factor, the fast drainage rate provided by the blend of flax virgin cellulose fibers and peanut hull virgin cellulose fibers can greatly reduce gas consumption in the process and reduce the cost of the product. In addition, the longer flax fibers appeared to reinforce and strengthen the insulation boards which all exhibited break loads above the minimum acceptable level.

As discussed above, the perlite-based insulation board of the present invention comprises, by dry weight, between about 50% and about 76% expanded perlite; between about 15% and about 45% fibers; between about 1% and about 5% starch; between about 2% and about 9% bituminous material; and about 0% to about 3% alum. The fibers are between about 50% and about 95% by dry weight recycled newsprint fibers and between about 5% and about 50% by dry weight virgin cellulose fibers, such as flax and/or peanut hull fibers. Preferably, the fibers in the perlite-based insulation board are, by dry weight, between about 10% and about 45% virgin cellulose fibers and between about 55% and about 90% recycled newsprint fibers and, most preferably, between about 20% and about 40% virgin cellulose fibers and between about 60% to about 80% recycled newsprint fibers. In another preferred embodiment of the present invention, the virgin cellulose fibers used in the compositions set forth in this paragraph, are between about 10% and about 40% flax fibers by dry weight and between about 60% and about 90% peanut hull fibers by dry weight and, most preferably, about 25% flax fibers by dry weight and about 75% peanut hull fibers by dry weight.

Preferably, the virgin cellulose fibers are flax fibers and/or peanut hull fibers. However, it is contemplated that other virgin cellulose fibers, such as but not limited to, bagasse (sugar cane fibers), kenaf, abaca, coconut, corn stalk, milk weed, rice straws, and wheat straws, could also be used in the perlite-based insulation boards of the present invention. The term recycled newsprint fibers also includes recycled telephone book fibers and like fibers.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A perlite-based insulation board comprising:

between about 50% and about 76% by dry weight expanded, perlite;

between about 15% and about 45% by dry weight fibers wherein between about 50% and about 95% by dry weight of said fibers are recycled newsprint fibers and between about 5% and about 50% by dry weight of said fibers are virgin cellulose fibers which have not been subjected to chemical pulping to remove lignin;

about 1% to about 5% by dry weight binder;

about 2% to about 9% by dry weight bituminous material; and about 0% to about 3% by dry weight alum.

2. The perlite-based insulation board according to claim 1, wherein: said virgin cellulose fibers comprise, by dry weight, between about 10% and about 40% flax fibers and between about 60% and about 90% peanut hull fibers.

3. The perlite-based insulation board according to claim 1, wherein: said virgin cellulose fibers comprise, by dry weight, about 25% flax fibers and about 75% peanut hull fibers.

4. The perlite-based insulation board according to claim 1, wherein: said recycled newsprint fibers are between about 55% and about 90% by dry weight of said fibers and said virgin cellulose fibers are between about 10% and about 45% by dry weight of said fibers.

5. The perlite-based insulation board according to claim 4, wherein: said virgin cellulose fibers comprise, by dry weight, between about 10% and about 40% flax fibers and between about 60% and about 90% peanut hull fibers.

6. The perlite-based insulation board according to claim 4, wherein: said virgin cellulose fibers comprise, by dry weight, about 25% flax fibers and about 75% peanut hull fibers.

7. The perlite-based insulation board according to claim 1, wherein: said recycled newsprint fibers are between about 60% and about 80% by dry weight of said fibers and said virgin cellulose fibers are between about 20% and about 40% by dry weight of said fibers.

8. The perlite-based insulation board according to claim 7, wherein: said virgin cellulose fibers comprise, by dry weight, between about 10% and about 40% flax fibers and between about 60% and about 90% peanut hull fibers.

9. The perlite-based insulation board according to claim 7, wherein: said virgin cellulose fibers comprise, by dry weight, about 25% flax fibers and about 75% peanut hull fibers.

10. The perlite-based insulation board according to claim 1, wherein: said virgin cellulose fibers are selected from a group consisting of peanut hull fibers and flax fibers.

11. The perlite-based insulation board according to claim 10, wherein: said recycled newsprint fibers are between about 55% and about 90% by dry weight of said fibers and said virgin cellulose fibers are between about 10% and about 45% by dry weight of said fibers.

12. The perlite-based insulation board according to claim 10, wherein: said recycled newsprint fibers are between about 60% and about 80% by dry weight of said fibers and said virgin cellulose fibers are between about 20% and about 40% by dry weight of said fibers.

13. The perlite-based insulation board according to claim 1, wherein: said binder is starch; and said bituminous material comprises asphalt.

14. The perlite-based insulation board according to claim 1, wherein: said virgin cellulose fibers have an average length of less than about one inch.

15. The perlite-based insulation board according to claim 1, wherein: said virgin cellulose fibers are selected from a group consisting of peanut hull, flax, bagasse, kenaf, abaca, coconut, corn stalk, milk weed, rice straw, and wheat straw fibers.

* * * * *